(12) United States Patent
Venkataramanan

(10) Patent No.: US 10,879,812 B2
(45) Date of Patent: Dec. 29, 2020

(54) SEMICONDUCTOR SWITCH

(71) Applicant: Wisconsin Alumni Research Foundation, Madison, WI (US)

(72) Inventor: Venkata Giri Venkataramanan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 85 days.

(21) Appl. No.: 16/378,875

(22) Filed: Apr. 9, 2019

(65) Prior Publication Data

US 2020/0328690 A1 Oct. 15, 2020

(51) Int. Cl.
*H02M 5/293* (2006.01)
*H02M 1/08* (2006.01)
*H02M 1/00* (2006.01)

(52) U.S. Cl.
CPC ............ *H02M 5/293* (2013.01); *H02M 1/08* (2013.01); *H02M 2001/0048* (2013.01)

(58) Field of Classification Search
CPC . H02M 5/293; H02M 1/08; H02M 2001/0048
See application file for complete search history.

(56) References Cited

U.S. PATENT DOCUMENTS

| | | |
|---|---|---|
| 5,570,279 A | 10/1996 | Venkataramanan |
| 5,602,725 A | 2/1997 | Venkataramanan |
| 6,982,890 B2 | 1/2006 | Venkataramanan |
| 2008/0252144 A1* | 10/2008 | Wang ............... H02J 9/062 307/66 |
| 2009/0090546 A1* | 4/2009 | Mechi ............. H02M 1/4216 174/260 |
| 2013/0027993 A1* | 1/2013 | Tan ................. H02M 1/32 363/40 |
| 2013/0208346 A1* | 8/2013 | Inoue .............. G02F 1/167 359/296 |
| 2019/0036336 A1* | 1/2019 | Kuznetsov ......... H02K 7/025 |

OTHER PUBLICATIONS

B.H. Cho, et. al. Cost-effective sustain driver employing a new four-quadrant switch cell for ac plasma display, IEEE Transactions on Consumer Electronics, vol. 55, No. 4, pp. 2040-2047, Nov. 2009.

(Continued)

*Primary Examiner* — Carlos Amaya
*Assistant Examiner* — Esayas G Yeshaw
(74) *Attorney, Agent, or Firm* — Bell & Manning, LLC

(57) ABSTRACT

A semiconductor switch includes four diodes, two transistors, and a capacitor. The capacitor includes a fourth terminal and a fifth terminal. An anode of a third diode is connected to a third terminal of a first transistor. A cathode of the third diode is connected to a first terminal of the first transistor and to an anode of a first diode. An anode of a fourth diode is connected to a third terminal of a second transistor. A cathode of the fourth diode is connected to a first terminal of the second transistor and to an anode of the second diode. A cathode of the first diode is connected to a cathode of the second diode and to the fourth terminal of the capacitor. An anode of the third diode is connected to the anode of the fourth diode and to the fifth terminal of the capacitor.

20 Claims, 17 Drawing Sheets

(56) References Cited

OTHER PUBLICATIONS

F. J. Daz, et. al., "Converter with four quadrant switches for edm applications," IEEE Transactions on Industry Applications, vol. 50, No. 6, pp. 4356-4362, Nov. 2014.

H. Qin and J. W. Kimball, "Solid-state transformer architecture using ac-ac dual-active-bridge converter," IEEE Transactions on Industrial Electronics, vol. 60, No. 9, pp. 3720-3730, Sep. 2013.

Raheja, et. al, "Applications and characterization of four quadrant GaN switch." Proceedings of Energy Conversion Congress and Exposition (ECCE), pp. 1967-1975, 2017.

* cited by examiner

SEMICONDUCTOR SWITCH

BACKGROUND

With the growth of wind energy systems, solar power systems, electric vehicles and electric storage systems, the electric grid is expected to see a major transformation. In realizing this transformation, the reliability, stability, and efficiency of the grid will require power flow controllers with flexible and higher performance levels than state of the art devices based on mechanical switches.

Four-quadrant (4-quadrant) switches for alternating current (AC) power conversion applications typically use single-quadrant semiconductors like metal oxide semiconductor field effect transistors (MOSFETs) and insulated-gate bipolar transistors (IGBTs) along with diodes, which pose a persistent problem. For example, a classical topology of using a single-quadrant switch across direct current (DC) terminals of a full bridge rectifier results in excessive conduction losses due to three semiconductors in a current conduction path. A better realization uses two series-connected single-quadrant switches, each with an antiparallel-diode resulting in reduced conduction losses; however, the two series-connected single-quadrant switches require careful sequencing of commutation to prevent voltage and/or current overshoots during switching. Additionally, the voltage blocking capability of discrete devices places an upper bound on the power for high voltage applications. These issues pose a significant barrier to commercial application of matrix converters, AC to AC converters, and solid state circuit breakers for AC systems that require practical, simple, and reliable semiconductor switches that are capable of 4-quadrant operation for conducting currents in both directions while blocking voltage in both directions.

SUMMARY

In an example embodiment, a semiconductor switch is provided that may include, but is not limited to, a first diode, a second diode, a third diode, a fourth diode, a first transistor, a second transistor, and a capacitor. The first diode includes, but is not limited to, a first anode and a first cathode. The second diode includes, but is not limited to, a second anode and a second cathode. The third diode includes, but is not limited to, a third anode and a third cathode. The fourth diode includes, but is not limited to, a fourth anode and a fourth cathode. The first transistor includes, but is not limited to, a first terminal, a second terminal, and a third terminal. The second transistor includes, but is not limited to, a fourth terminal, a fifth terminal, and a sixth terminal. The capacitor includes, but is not limited to, a seventh terminal and an eighth terminal. The third anode of the third diode is connected to the third terminal of the first transistor, and the third cathode of the third diode is connected to the first terminal of the first transistor and to the first anode of the first diode. The fourth anode of the fourth diode is connected to the third terminal of the second transistor, and the fourth cathode of the fourth diode is connected to the first terminal of the second transistor and to the second anode of the second diode. The first cathode of the first diode is connected to the second cathode of the second diode and to the seventh terminal of the capacitor. The third anode of the third diode is connected to the fourth anode of the fourth diode and to the eighth terminal of the capacitor opposite the seventh terminal of the capacitor.

In another example embodiment, a power conversion system is provided. The power conversion system includes, but is not limited to, an alternating current (AC) electrical source, an AC electrical load circuit, and the semiconductor switch connected between the electrical source and the electrical load circuit.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
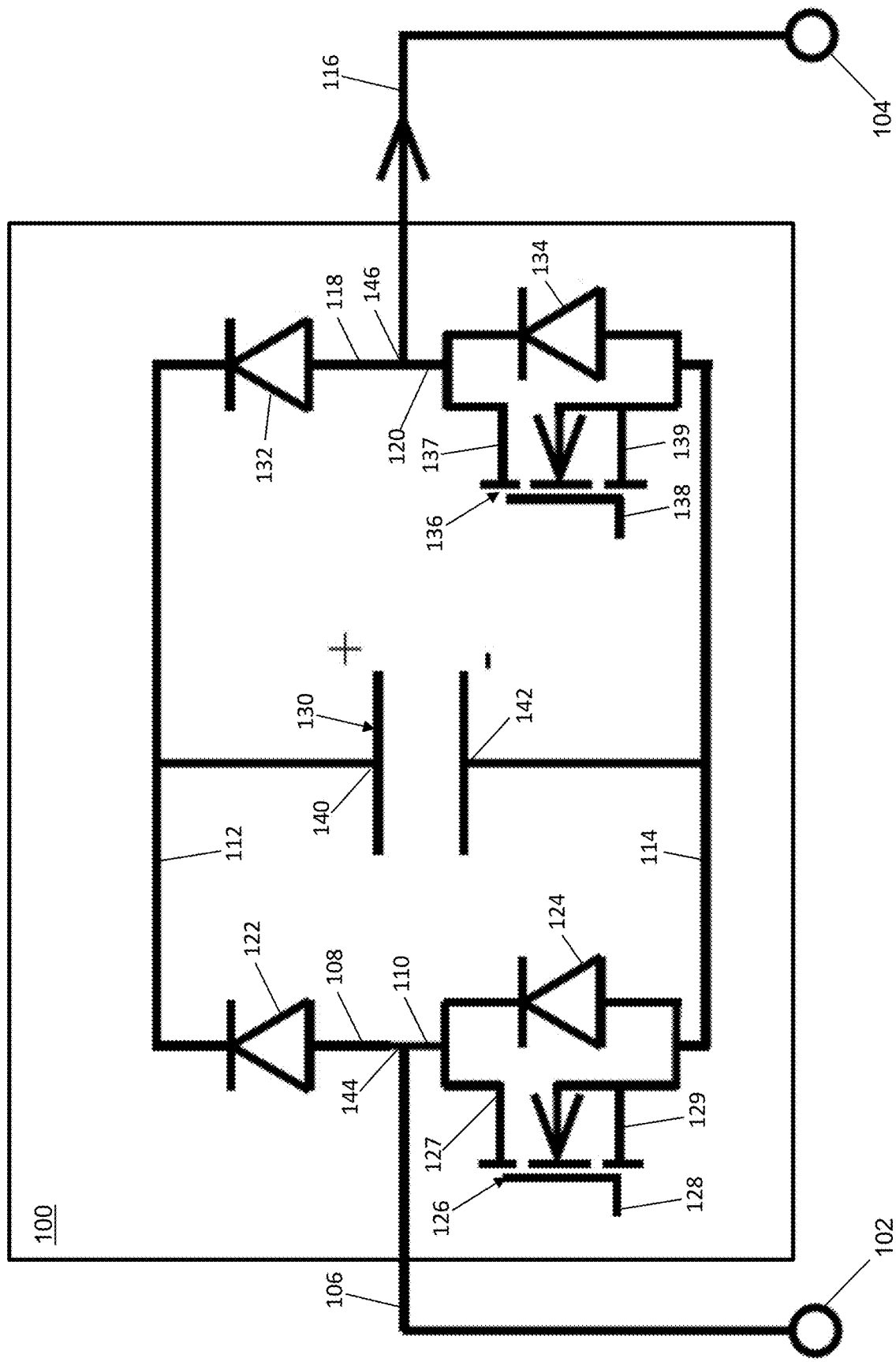
FIG. 1 is a circuit diagram of a semiconductor switch in accordance with an illustrative embodiment.

Referring to FIG. 1, a semiconductor switch 100 is shown in accordance with an illustrative embodiment. Semiconductor switch 100 may be connected between a source terminal 102 and a load terminal 104. Semiconductor switch 100 may include a first diode 122, a second diode 132, a third diode 124, a fourth diode 134, a first transistor 126, a second transistor 136, and a capacitor 130. Third diode 124 is connected antiparallel across first transistor 126, and fourth diode 134 is connected antiparallel across second transistor 136.

First diode 122, second diode 132, third diode 124, and fourth diode 134 may be diodes of various types such as a p-n junction type, a thyristor, etc. with various ratings. As understood by a person of skill in the art, a diode is a two-terminal electronic component that conducts current primarily in one direction from an anode to a cathode.

First transistor 126 may include a first terminal 127, a second terminal 128, and a third terminal 129. First terminal 127, second terminal 128, and third terminal 129 may be referred to as a drain, a gate, and a source, respectively, for a metal-oxide-semiconductor field-effect transistor (MOSFET), or as a collector, a gate, and an emitter, respectively, for an insulated-gate bipolar transistor (IGBT), or as a collector, a base, and an emitter, respectively, for a bipolar junction transistor (BJT).

Second transistor 136 may include a fourth terminal 137, a fifth terminal 138, and a sixth terminal 139. Fourth terminal 137, fifth terminal 138, a sixth terminal 139 may be referred to as a drain, a gate, and a source, respectively, for a MOSFET, or as a collector, a gate, and an emitter, respectively, for an IGBT, or as a collector, a base, and an emitter, respectively, for a BJT. Depending on a switching logic and whether first transistor 126 and second transistor 136 are an n-type or a p-type, the drain and the source may be reversed. A voltage applied to second terminal 128 and to fifth terminal 138 determines a switching state of first transistor 126 and of second transistor 136, respectively, as in an on-state or as an in an off-state. First transistor 126 and second transistor 136 are switched into the on-state or the off-state at the approximately the same time such that each is either in the on-state or in the off-state at the same time. First transistor 126 and second transistor 136 have a same rating and a same transistor type. In the illustrative embodiment, first transistor 126 and second transistor 136 are n-type, enhancement mode MOSFETs formed of various materials though other transistor types may be used.

A source line 106 connects to a source connector 144 between a first anode of first diode 122 and a third cathode of third diode 124 and first terminal 127 of first transistor 126. A load line 116 connects to a load connector 146 between a second anode of second diode 132 and a fourth cathode of fourth diode 134 and fourth terminal 137 of second transistor 136. Source line 106 may split into a first line 108 and a second line 110. First line 108 connects source line 106 to the first anode of first diode 122. Second line 110 connects source line 106 to the third cathode of third diode 124 and to first terminal 127 of first transistor 126. Load line 116 may split into a third line 118 and a fourth line 120.

Third line 118 connects load line 116 to the second anode of second diode 132. Fourth line 120 connects load line 116 to the fourth cathode of fourth diode 134 and to first terminal 137 of second transistor 136. A fifth line 112 connects between a first cathode of first diode 122 and a second cathode of second diode 132. A sixth line 114 connects between a third anode of third diode 124 and a fourth anode of fourth diode 134 and also between third terminal 129 of first transistor 126 and sixth terminal 139 of second transistor 136. Fifth line 112 may be referred to as a positive bus of semiconductor switch 100, and sixth line 114 may be referred to as a negative bus of semiconductor switch 100.

Capacitor 130 connects between fifth line 112 and sixth line 114. Capacitor 130 may be a capacitor of various types and with various ratings. As understood by a person of skill in the art, a capacitor is a passive two-terminal electronic component that stores electrical energy in an electric field and has an associated rated capacitance value C. As a result, capacitor 130 may include a seventh terminal 140 and an eighth terminal 142. In an illustrative embodiment, seventh terminal 140 may be referred to as a positive terminal of capacitor 130, and eighth terminal 142 may be referred to as a negative terminal of capacitor 130.

Semiconductor switch 100 can be described as a bidirectional voltage and a bidirectional current H-bridge module formed using two unidirectional voltage bidirectional current semi-controlled half-bridge modules that each consist of two diodes and a transistor. Capacitor 130 is connected in parallel between the two semi-controlled half-bridge modules. First diode 122, third diode 124 and first transistor 126 form a first half-bridge module, and second diode 132, fourth diode 134 and second transistor 136 form a second half-bridge module.

Figure 2:
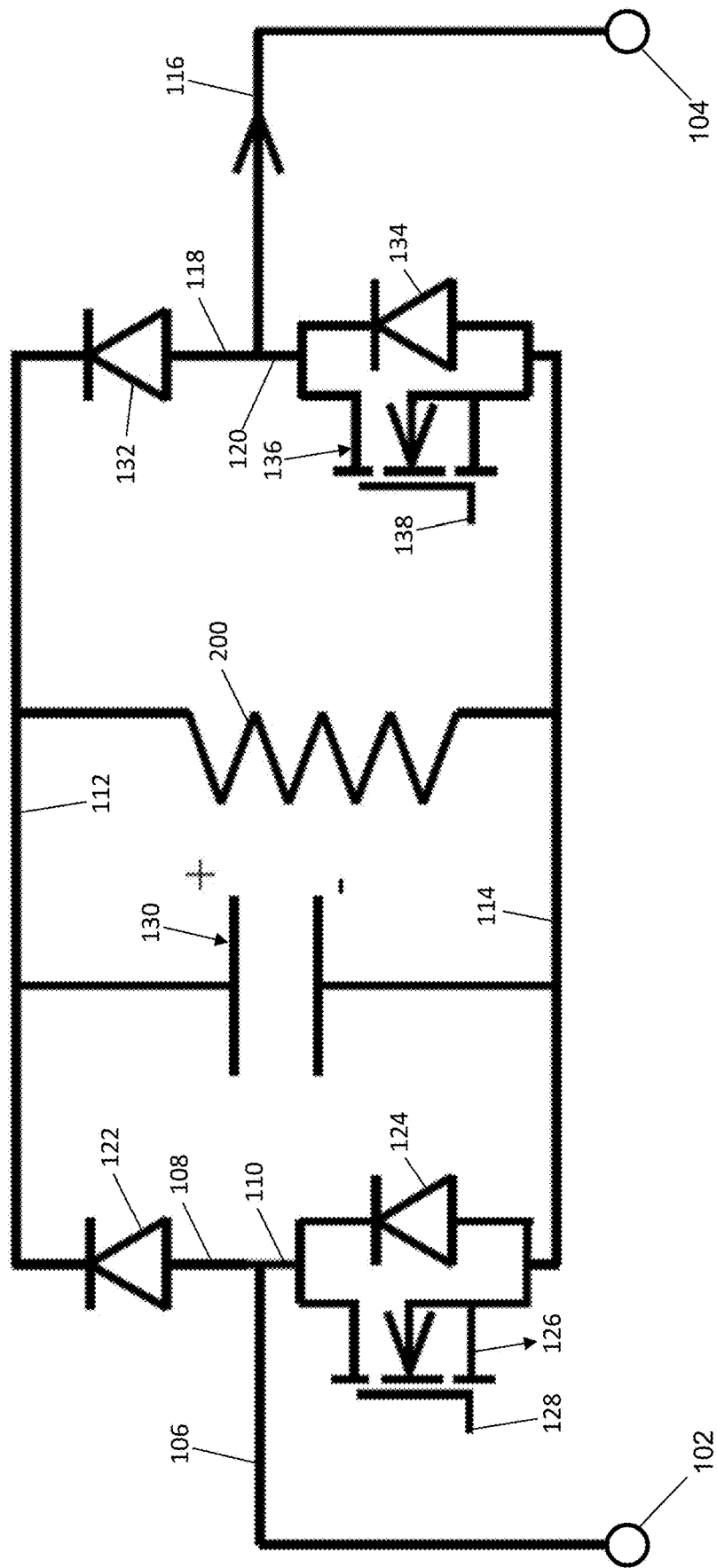
FIG. 2 is a circuit diagram for modeling the semiconductor switch of FIG. 1 in an on-state in accordance with an illustrative embodiment.
Figure 3:
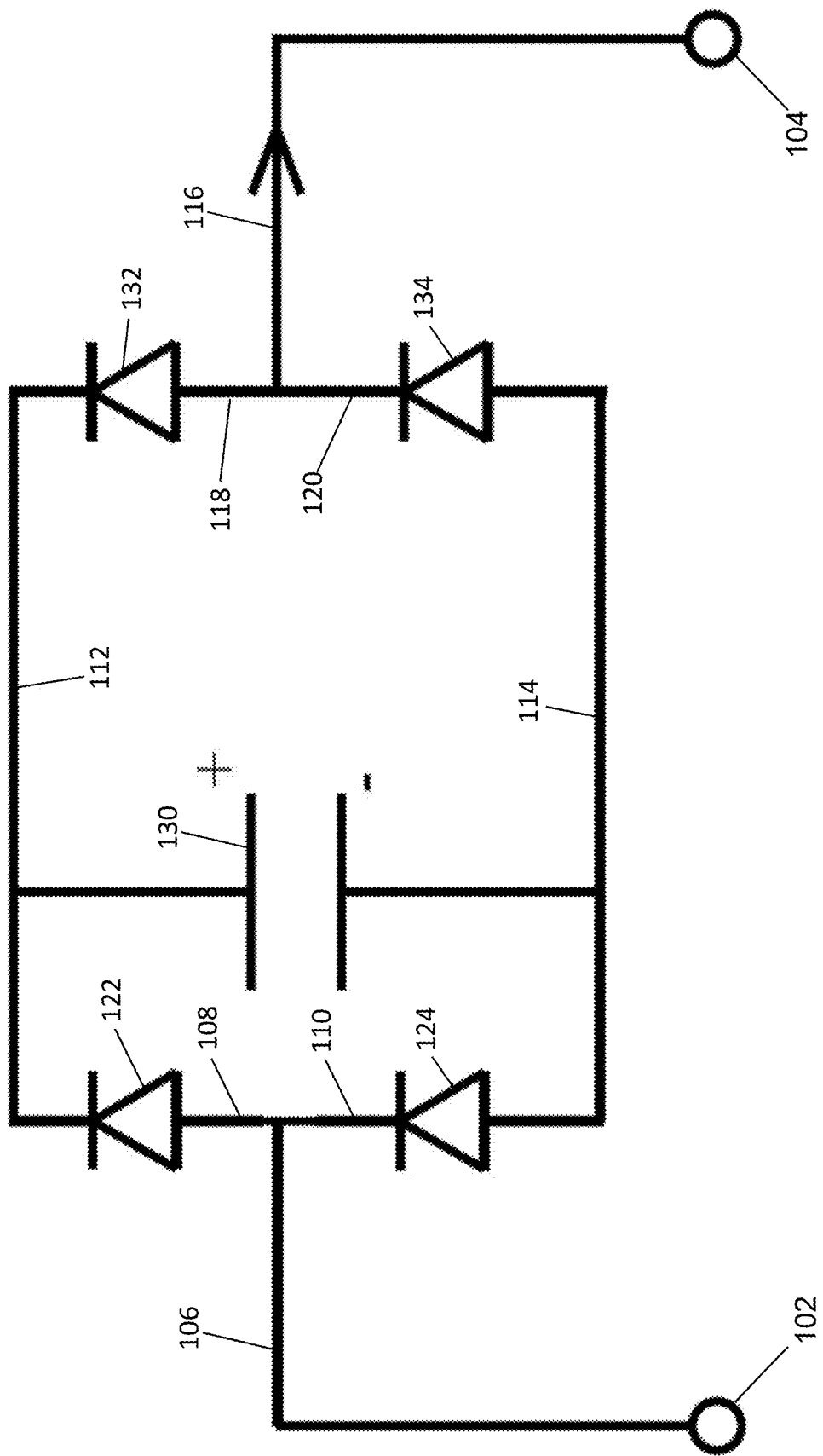
FIG. 3 is a circuit diagram for modeling the semiconductor switch of FIG. 1 in an off-state in accordance with an illustrative embodiment.

Referring to FIG. 2, a circuit diagram for modeling the semiconductor switch of FIG. 1 in an on-state is shown in accordance with an illustrative embodiment. Referring to FIG. 3, a circuit diagram for modeling the semiconductor switch of FIG. 1 in an off-state is shown in accordance with an illustrative embodiment. Though an ideal capacitor does not dissipate energy, capacitor 130 generally has a leakage current that can be modeled as a resistor 200 connected between fifth line 112 and sixth line 114 and having a resistance value R.

For the off-state of semiconductor switch 100, first transistor 126 and second transistor 136 are maintained in an off-state based on an off-state control signal provided by a controller 1702 (shown referring to FIG. 17) to second terminal 128 of first transistor 126 and to fifth terminal 138 of second transistor 136. For the on-state of semiconductor switch 100, first transistor 126 and second transistor 136 are turned on based on an on-state control signal provided by controller 1702 to second terminal 128 of first transistor 126 and to fifth terminal 138 of second transistor 136.

As shown referring to FIG. 3, during the off-state, both first transistor 126 and second transistor 136 are switched off, and first diode 122, second diode 132, third diode 124, and fourth diode 134 behave as a full-wave rectifier, and charge capacitor 130 to a peak value of an AC voltage (V) after which first diode 122, second diode 132, third diode 124, and fourth diode 134 stop conducting. Each of first diode 122, second diode 132, third diode 124, and fourth diode 134 are reverse biased and ensure that there is no current flow in the AC circuit.

On the other hand, as shown referring to FIG. 2, during the on-state, both first transistor 126 and second transistor 136 are switched on to provide a current flow path for a current that bypasses capacitor 130. If the current is positive and flows from source terminal 102 toward load terminal 104, first transistor 126 and fourth diode 134 provide a current flow path. If the current is negative and flows from load terminal 104 toward source terminal 102, second transistor 136 and third diode 124 provide a current flow path. As a result, bidirectional current flow is provided.

A primary operating principle of semiconductor switch 100 is the fundamental direct current (DC) blocking property of capacitor 130 that acts as an open circuit for steady state DC currents because any capacitor appears as an open circuit in a DC path of currents. Thus, semiconductor switch 100 with capacitor 130 across DC terminals defined between fifth line 112 and sixth line 114 appears to be an open circuit across the AC terminals of source terminal 102 and load terminal 104 at steady state regardless of a polarity of the AC voltage. A steady state condition for semiconductor switch 100 is reached after capacitor 130 has reached its DC bias level (typically drawing energy from the AC circuit) that prevents any further current conduction. Semiconductor switch 100 is shoot-through proof because there is no totem-pole connected half-bridge in the circuit topology.

Design of power circuit components for semiconductor switch 100 may be based on two major application areas that relate to a rate of switching between the on-state and the off-state of first transistor 126 and second transistor 136, and thus, switching of semiconductor switch 100 between the on-state and the off-state. A bias voltage for capacitor 130 may be selected as an adequate level to accommodate any leakage and loss of energy due to resistor 200 modeled across capacitor 130 during an on-state so that semiconductor switch 100 operates as an open circuit during its off-state. Referring to FIG. 2, if a leakage of capacitor energy can be modeled in terms of resistor 200 having a resistance value R and capacitor 130 having the capacitance value C, a time constant RC may be selected to be much larger than an expected interval between successive off-states of semiconductor switch 100 to ensure that capacitor 130 can provide an acceptable blocking condition when first transistor 126 and second transistor 136 are switched to the off-state.

For applications of semiconductor switch 100 in power converters that operate at several kilohertz (kHz) to several 100s of kHz, capacitor 130 may be implemented using a film capacitor having a capacitance value C of a fraction of a microfarad (µF) with a resistance value R in the range of 100 kiloohms (kΩ) that provide an adequately large time constant RC compared to an on-state interval of semiconductor switch 100.

For applications of semiconductor switch 100 in general purpose power circuit switching applications such as solid state relays, circuit breakers, etc., a rate of switching may be event-driven or occasional such that a time interval between switching events may range from minutes to days. Here a much larger capacitance value C may be selected to provide an adequate amount of energy storage. As another option, one or both of first transistor 126 and second transistor 136 can be turned off for a short interval of time to recharge capacitor 130 by circulating the load current through capacitor 130 without any appreciable impact on the load. A separate bias circuit (not shown) may also be used to pre-charge capacitor 130 with a DC voltage that is greater than or equal to a peak value of the AC blocking voltage.

The current ratings of first transistor 126 and second transistor 136 and of third diode 124 and fourth diode 134 may be selected to carry the load current based on the application area. A rating of first transistor 126 and third diode 124 may be selected to carry a positive half-cycle of the current and a rating of second transistor 136 and fourth diode 134 may be selected to carry a negative half-cycle of the current. A rating of first diode 122 and second diode 132 may be selected to carry only the leakage current used to maintain the DC bias conditions for capacitor 130.

Figure 4:
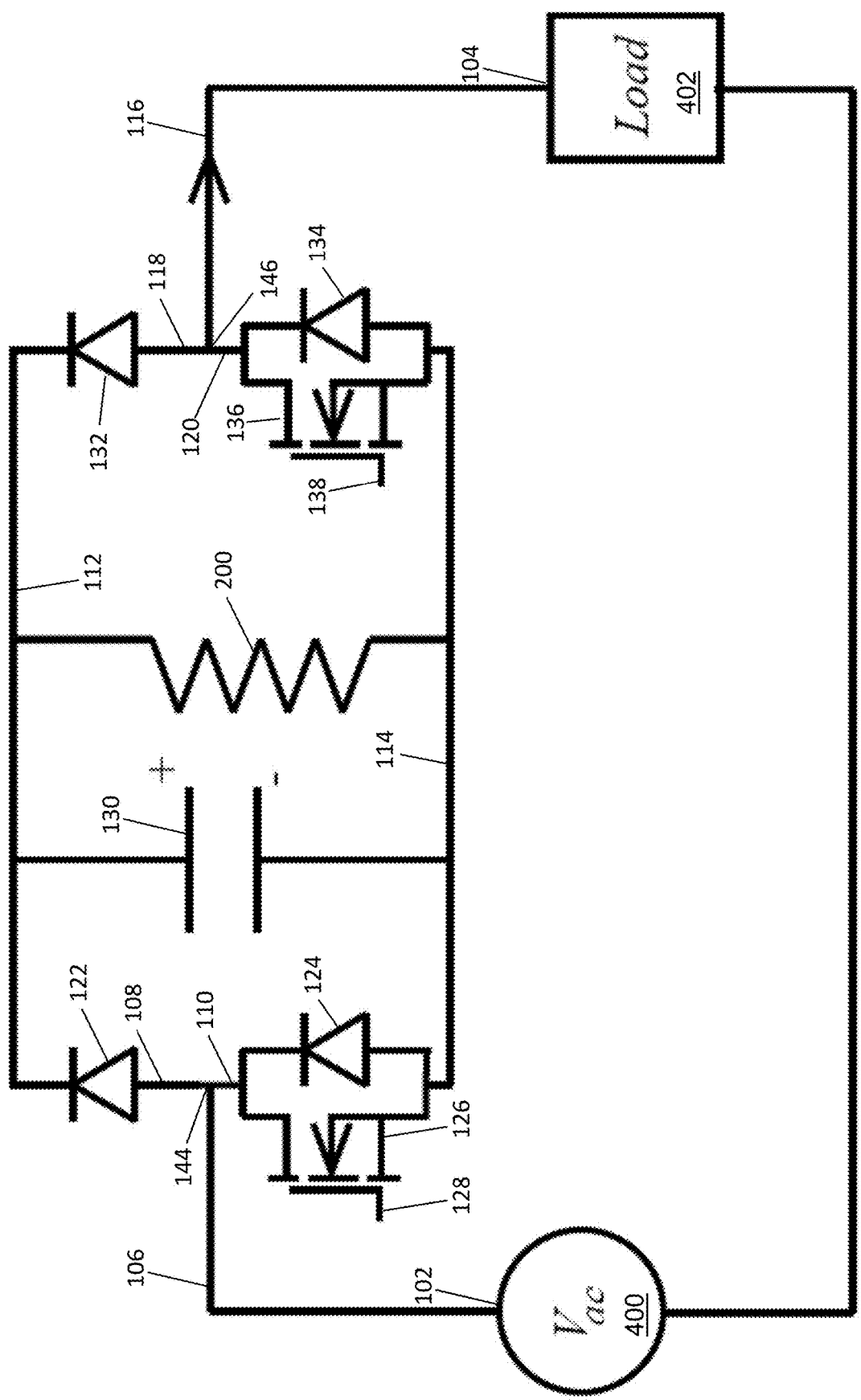
FIG. 4 is a circuit diagram for modeling the semiconductor switch of FIG. 1 connected between an alternating current (AC) electrical source and an AC electrical load in accordance with an illustrative embodiment.

Referring to FIG. 4, an illustrative application of semiconductor switch 100 is shown in accordance with an illustrative embodiment. Semiconductor switch 100 is connected between an alternating current (AC) electrical source 400 through source terminal 102 and an AC electrical load 402 through load terminal 104. AC electrical source 400 may include one or more AC source circuits that provide electrical power. AC electrical load 402 may include one or more AC load circuits that act as electrical loads that receive the provided electrical power. Some or all of AC electrical source 400 and/or AC electrical load 402 may provide bidirectional power flow such that a source circuit and/or a load circuit may act as a power source during a first time period and as an electrical load during a second time period. As discussed previously, semiconductor switch 100 provides bidirectional current flow between AC electrical source 400 and AC electrical load 402 while blocking voltage from AC electrical load 402 to AC electrical source 400 under control of a switching state of semiconductor switch 100 by controller 1702.

Figure 5:
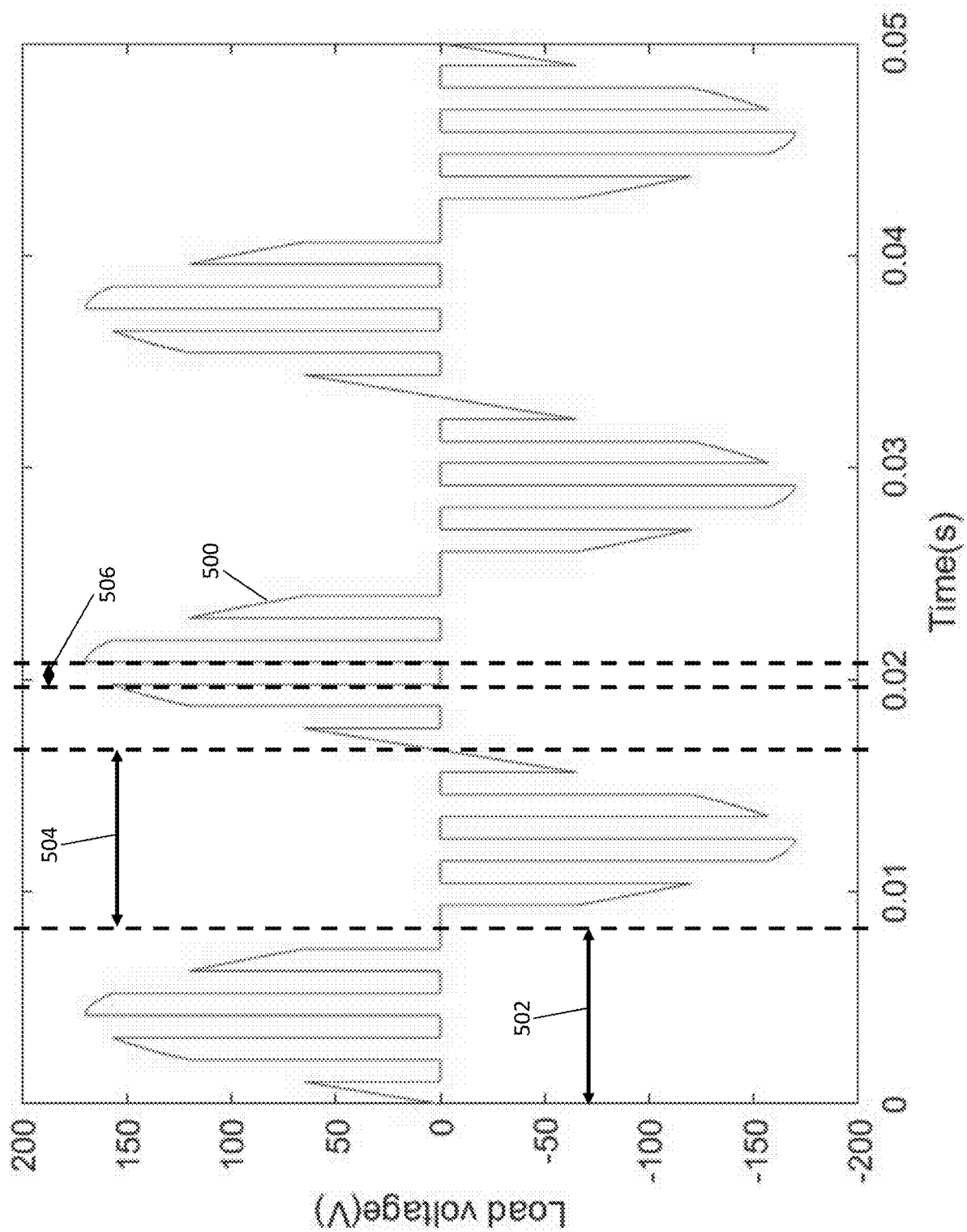
FIG. 5 shows a simulated load voltage generated using the semiconductor switch of FIG. 1 as a pulse width modulated (PWM) resistive chopper in accordance with an illustrative embodiment.
Figure 6:
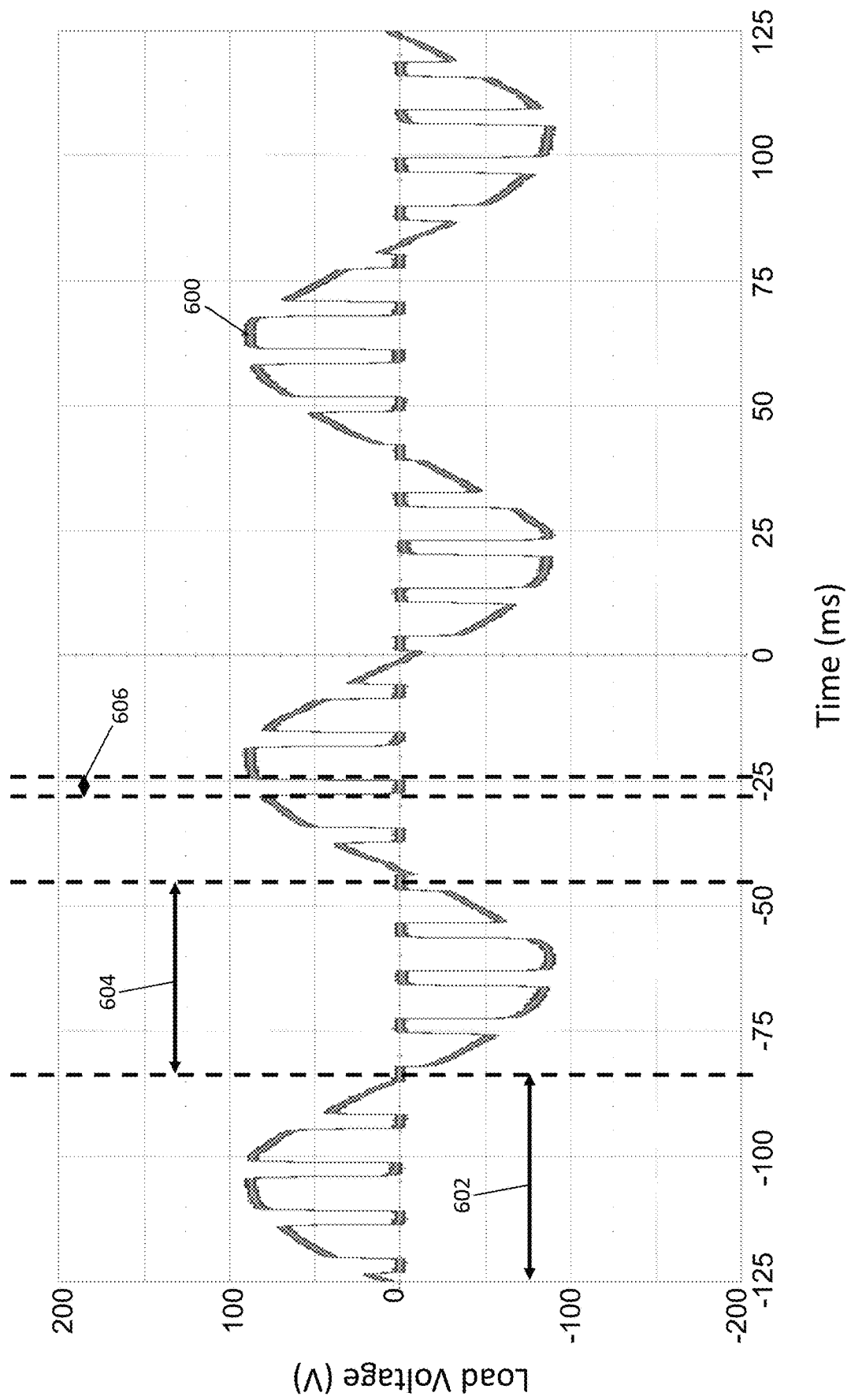
FIG. 6 shows a measured load voltage generated using the semiconductor switch of FIG. 1 as the PWM resistive chopper in accordance with an illustrative embodiment.

Referring to FIG. 5, a simulated load voltage curve 500 generated using semiconductor switch 100 as a pulse width modulated (PWM) resistive chopper is shown in accordance with an illustrative embodiment. Referring to FIG. 6, a measured load voltage curve 600 generated using a hardware implementation of semiconductor switch 100 as the PWM resistive chopper is shown in accordance with an illustrative embodiment. AC electrical source 400 was implemented as a 12 volt (V) 60 hertz (Hz) AC source and AC electrical load 402 was implemented as a 60 watt (W) lamp resistive load. A capacitance value for capacitor 130 was 220 µF with a resistance value of 100 kΩ. Semiconductor switch 100 was operated using 500 Hz switching frequency with a duty ratio of approximately 66%. The relatively low 500 Hz switching frequency was selected so that the switching phenomenon could be clearly visualized in the results of FIGS. 5 and 6. First transistor 126 and second transistor 136 were implemented as MOSFETs. Capacitor 130 was used to pulse width modulate the AC voltage so that only a fraction of the AC voltage was applied to AC electrical load 402.

Referring to FIG. 5, non-zero intervals of simulated load voltage curve 500 during a positive half-cycle 502 were generated with both first transistor 126 and second transistor 136 switched to the on-state and with current flowing from source terminal 102 toward load terminal 104 through first transistor 126 and fourth diode 134. Non-zero intervals of simulated load voltage curve 500 during a negative half-cycle 504 were generated with both first transistor 126 and second transistor 136 switched to the on-state and with current flowing from load terminal 104 toward source terminal 102 through second transistor 136 and third diode 124. A width 506 of each zero-interval is an inverse of the 500 Hz switching frequency. As a result, width 506 of each zero-interval can be shortened by increasing the switching frequency.

Similarly, referring to FIG. 6, non-zero intervals of measured load voltage curve 600 during a positive half-cycle 602 were generated with both first transistor 126 and second transistor 136 switched to the on-state and with current flowing from source terminal 102 toward load terminal 104 through first transistor 126 and fourth diode 134. Non-zero intervals of measured load voltage curve 600 during a negative half-cycle 604 were generated with both first transistor 126 and second transistor 136 switched to the on-state and with current flowing from load terminal 104 toward source terminal 102 through second transistor 136 and third diode 124. A width 606 of each zero-interval is the inverse of the 500 Hz switching frequency. As a result, bidirectional current flow and unidirectional voltage with voltage blocking is provided by semiconductor switch 100.

Figure 7:
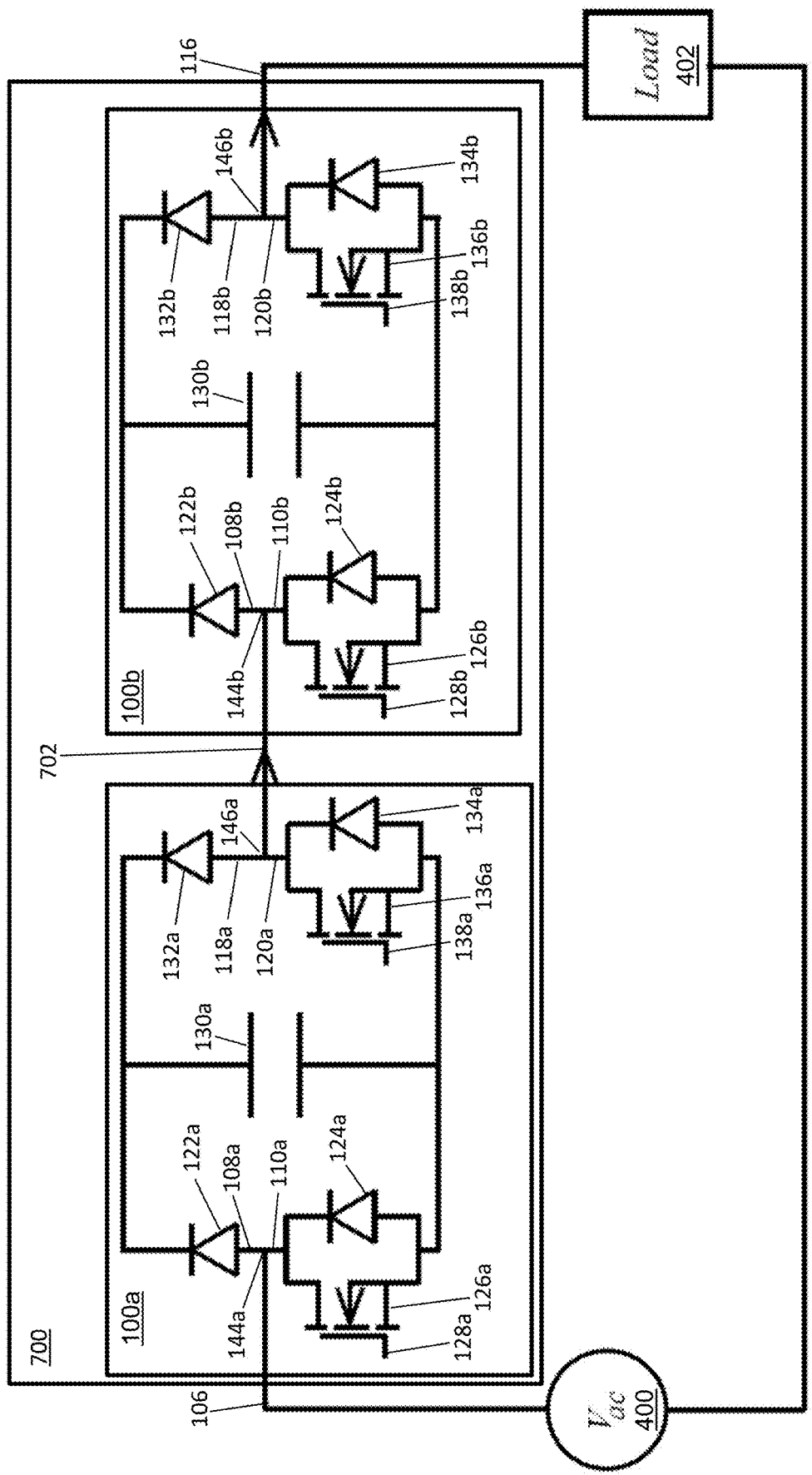
FIG. 7 is a circuit diagram of two series connected semiconductor switches of FIG. 1 connected between the AC electrical source and the AC electrical load in accordance with an illustrative embodiment.

In alternative embodiments, any number of semiconductor switches 100 may be connected in series between AC electrical source 400 and AC electrical load 402. For example, referring to FIG. 7, a circuit diagram of two series connected semiconductor switches 700 connected between AC electrical source 400 and AC electrical load 402 are shown in accordance with an illustrative embodiment. The two series connected semiconductor switches 700 include a first semiconductor switch 100a and a second semiconductor switch 100b that are both implementations of semiconductor switch 100.

First semiconductor switch 100a may include a first diode 122a, a second diode 132a, a third diode 124a, a fourth diode 134a, a first transistor 126a, a second transistor 136a, and a capacitor 130a. Second semiconductor switch 100b may include a first diode 122b, a second diode 132b, a third diode 124b, a fourth diode 134b, a first transistor 126b, a second transistor 136b, and a capacitor 130b.

Source line 106 connects to a source connector 144a of first semiconductor switch 100a between a first anode of first diode 122a and a third cathode of third diode 124a and a first transistor 126a. Load line 116 connects to a load connector 146b of second semiconductor switch 100b between a second anode of second diode 132b and a fourth cathode of fourth diode 134b and second transistor 136. Source line 106 may split into a first line 108a and a second line 110a. Load line 116 may split into a third line 118b and a fourth line 120b. A seventh line 702 connects between a load connector 146a of first semiconductor switch 100a and a source connector 144b of second semiconductor switch 100b to connect first semiconductor switch 100a and a second semiconductor switch 100b in series between AC electrical source 400 and AC electrical load 402.

Series connection of a plurality of semiconductor switches 100 enables a higher voltage blocking capability because the peak AC line voltage is split between the series connected switches. First transistor 126 and second transistor 136 of each semiconductor switch 100 (e.g., first transistor 126a and second transistor 136a of first semiconductor switch 100a and first transistor 126b and second transistor 136b of second semiconductor switch 100b) can be switched to the on-state and off-state independently and with a small time delay between them without causing issues with circuit operation. A small bleeding or equalization capacitor can be connected in parallel with capacitor 130a of first semiconductor switch 100a and with capacitor 130b of second semiconductor switch 100b to ensure adequate voltage balancing without active control.

Figure 8:
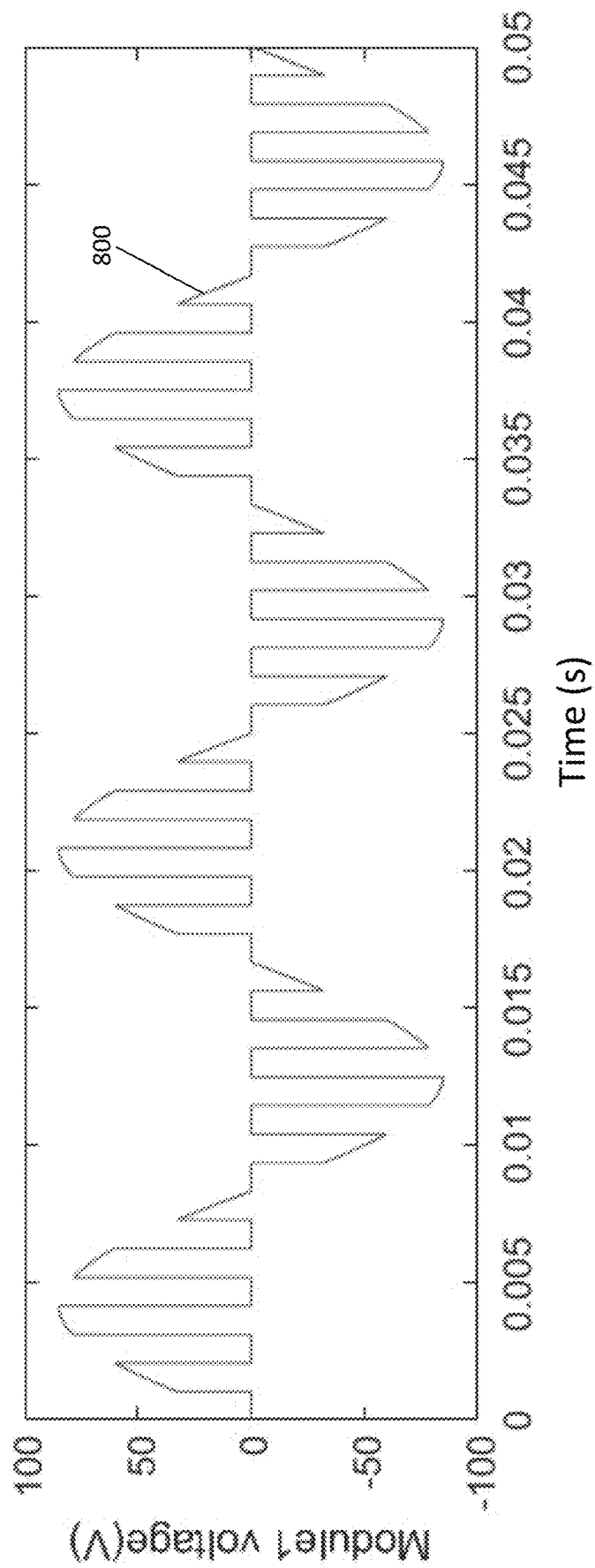
FIG. 8 shows a simulated voltage generated by a first semiconductor switch of the two series connected semiconductor switches of FIG. 7 in accordance with an illustrative embodiment.
Figure 9:
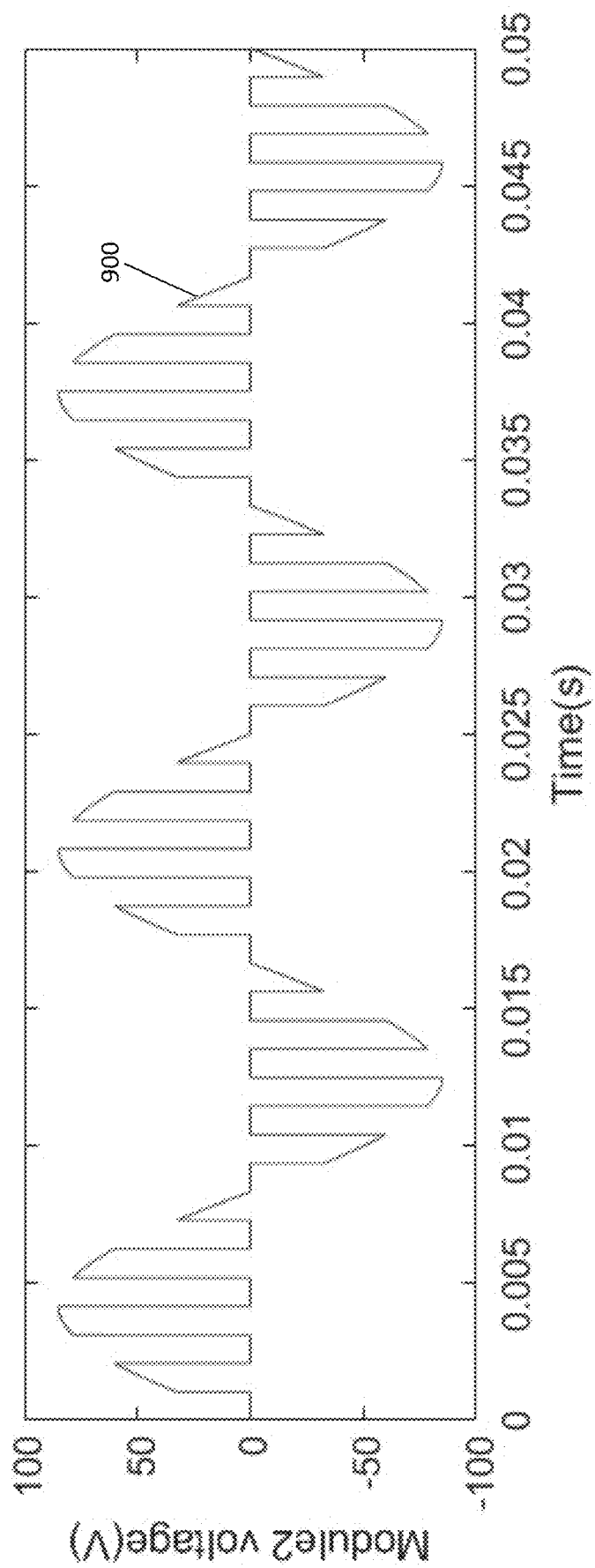
FIG. 9 shows a simulated voltage generated by a second semiconductor switch of the two series connected semiconductor switches of FIG. 7 in accordance with an illustrative embodiment.

Referring to FIG. 8, a first simulated voltage curve 800 generated by first semiconductor switch 100a of the two series connected semiconductor switches 700 is shown in accordance with an illustrative embodiment. Referring to FIG. 9, a second simulated voltage curve 900 generated by second semiconductor switch 100b of the two series connected semiconductor switches 700 is shown in accordance with an illustrative embodiment. Both first simulated voltage curve 800 and second simulated voltage curve 900 have similar characteristics to simulated load voltage curve 500. First simulated voltage curve 800 and second simulated voltage curve 900 were generated using semiconductor switch 100 implemented similar to that described with reference to FIG. 5 except using a duty ratio of approximately 50%. The equal division of the AC source voltage between first semiconductor switch 100a and second semiconductor switch 100b is clearly shown. The modular realization of semiconductor switch 100 makes it essentially insensitive to small variations in switching time delays and circuit parameter values by using a blocking capacitance value C for capacitor 130 in each semiconductor switch 100.

Figure 10:
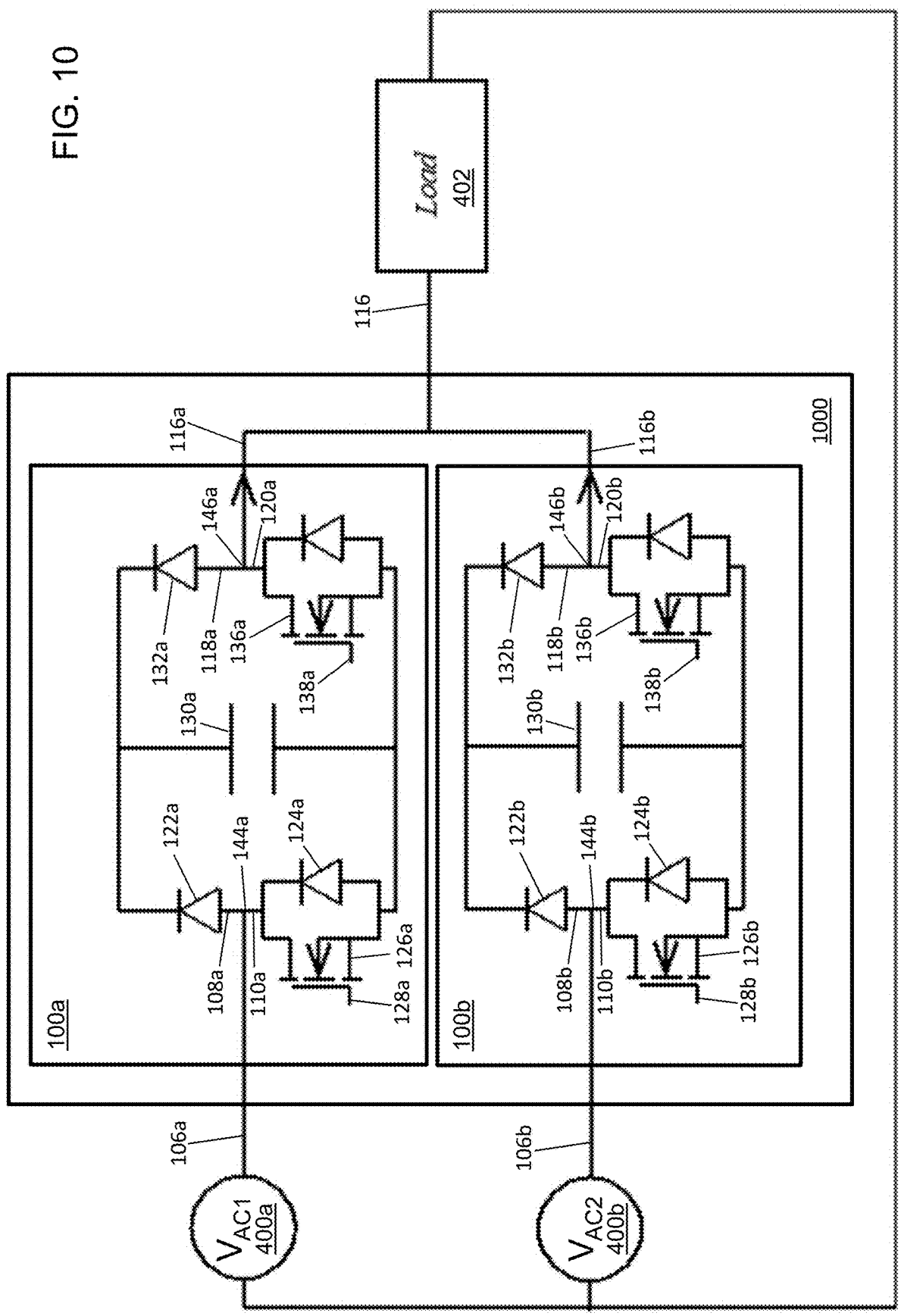
FIG. 10 is a circuit diagram of a first semiconductor switch of FIG. 1 connected between a first AC electrical source and the AC electrical load and of a second semiconductor switch of FIG. 1 connected between a second AC electrical source and the AC electrical load in accordance with an illustrative embodiment.

Semiconductor switch 100 can also be connected between a plurality of AC electrical loads 402 and a plurality of AC electrical sources 400 with each semiconductor switch 100 acting as a throw or a pole of multiple throws and multiple poles to realize particular power flow control requirements. For example, referring to FIG. 10, a single pole, double throw switching arrangement 1000 is shown in accordance with an illustrative embodiment. Single pole double throw switching arrangement 1000 may include first semiconductor switch 100a and second semiconductor switch 100b connected in parallel. First semiconductor switch 100a is connected between a first AC electrical source 400a and AC electrical load 402, and second semiconductor switch 100b is connected between a second AC electrical source 400b and AC electrical load 402.

A first source line 106a from first AC electrical source 400a connects to source connector 144a of first semiconductor switch 100a. A first load line 116a connects between load connector 146a of first semiconductor switch 100a and load line 116 of AC electrical load 402. A second source line 106b from second AC electrical source 400b connects to source connector 144b of second semiconductor switch 100b. A second load line 116b connects between load connector 146b of second semiconductor switch 100b and load line 116 of AC electrical load 402.

Any number of semiconductor switches can be connected in parallel between different AC electric sources and AC electrical loads 402. Similarly, multiple poles may be implemented using a plurality of AC electrical loads 402. Additionally, parallel connected semiconductor switch 100 may include one or more series connected semiconductor switches 100 in a manner similar to the two series connected semiconductor switches 700 to provide a higher voltage blocking capability.

Operation of parallel connected first semiconductor switch 100a and second semiconductor switch 100b may be used to direct power flow from first AC electrical source 400a and from second AC electrical source 400b to AC electrical load 402. Controller 1702 may control an on-state and an off-state of first semiconductor switch 100a and second semiconductor switch 100b to achieve the particular power flow control requirements from first AC electrical source 400a to AC electrical load 402 and from second AC electrical source 400b to AC electrical load 402. Controller 1702 further may control an on-state and an off-state of each parallel connected semiconductor switch 100 to achieve the particular power flow control requirements from one or more AC electric sources and one or more AC electric loads.

Figure 11:
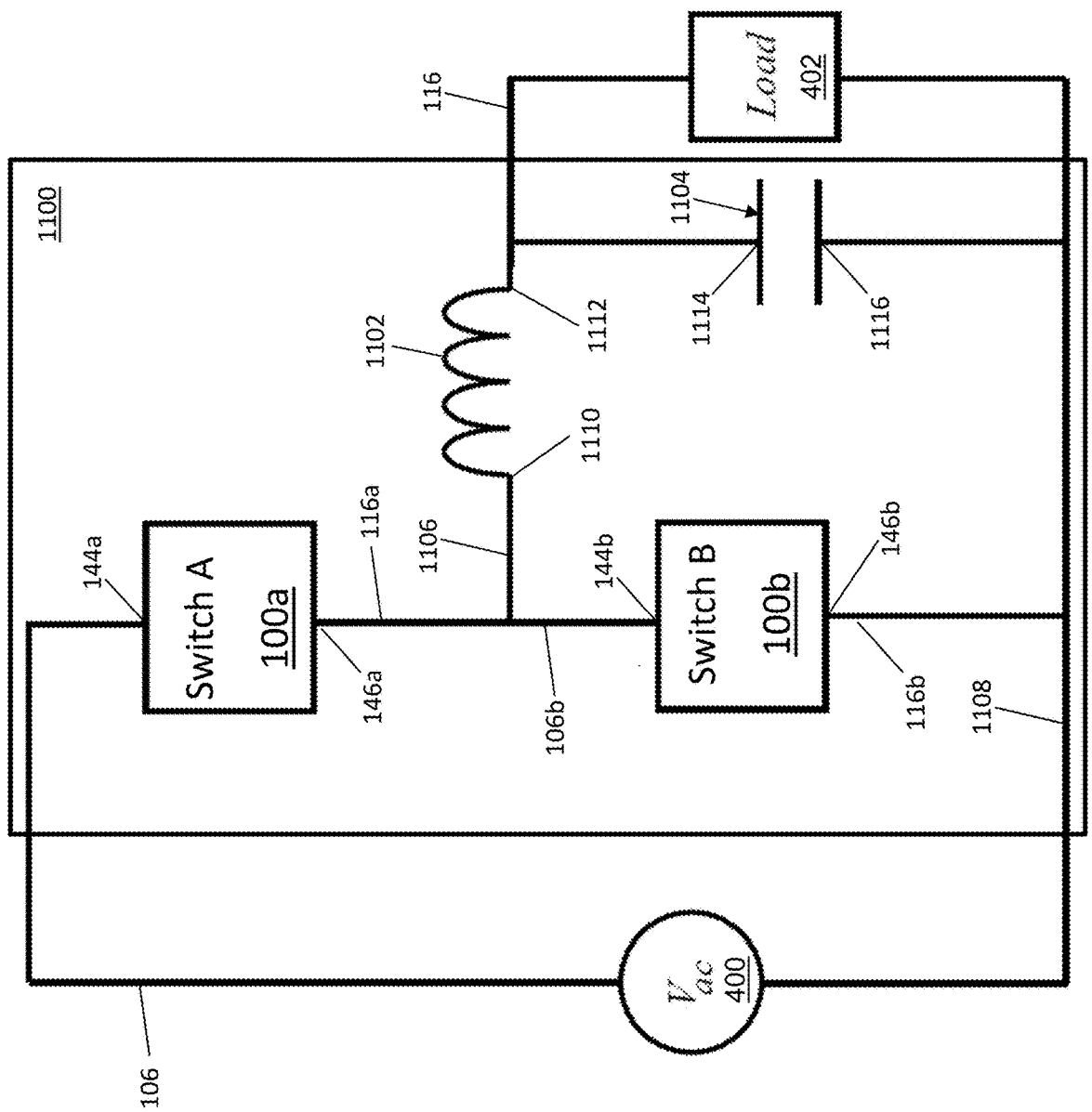
FIG. 11 is a circuit diagram of a first semiconductor switch of FIG. 1 and of a second semiconductor switch of FIG. 1 connected to form an AC-AC buck converter in accordance with an illustrative embodiment.

Referring to FIG. 11, a circuit diagram of first semiconductor switch 100a and of second semiconductor switch 100b connected to form an AC-AC buck converter 1100 is shown in accordance with an illustrative embodiment. AC-AC buck converter 1100 may include first semiconductor switch 100a, second semiconductor switch 100b, an inductor 1102 and a second capacitor 1104 connected between AC electrical source 400 and AC electrical load 402. Inductor 1102 may include a ninth terminal 1110 and a tenth terminal 1112. Second capacitor 1104 may include an eleventh terminal 1114 and a twelfth terminal 1116.

First semiconductor switch 100a is connected between AC electrical source 400 and both second semiconductor switch 100b and ninth terminal 1114 of inductor 1102. Source line 106 connects to source connector 144a of first semiconductor switch 100a. Second semiconductor switch 100b is connected between both first semiconductor switch 100a and ninth terminal 1114 of inductor 1102 and an eighth line 1108 that may be referred to as a negative bus between AC electrical source 400 and AC electrical load 402. Second load line 116b out of second semiconductor switch 100b connects to load connector 146b of second semiconductor switch 100b and eighth line 1108. Second capacitor 1104 is connected between load line 116 and eighth line 1108 in parallel with AC electrical load 402.

Ninth terminal 1110 of inductor 1102 is connected between load connector 146a of first semiconductor switch 100a and source connector 144b of second semiconductor switch 100b. A load line 116a out of first semiconductor switch 100a connects to source line 106b into second semiconductor switch 100b. Tenth terminal 1112 of inductor 1102 is connected between eleventh terminal 1114 of second capacitor 1104 and AC electrical load 402. A ninth line 1106 connects ninth terminal 1110 of inductor 1102 between first load line 116a out of first semiconductor switch 100a and second source line 106b into second semiconductor switch 100b.

Figure 12:
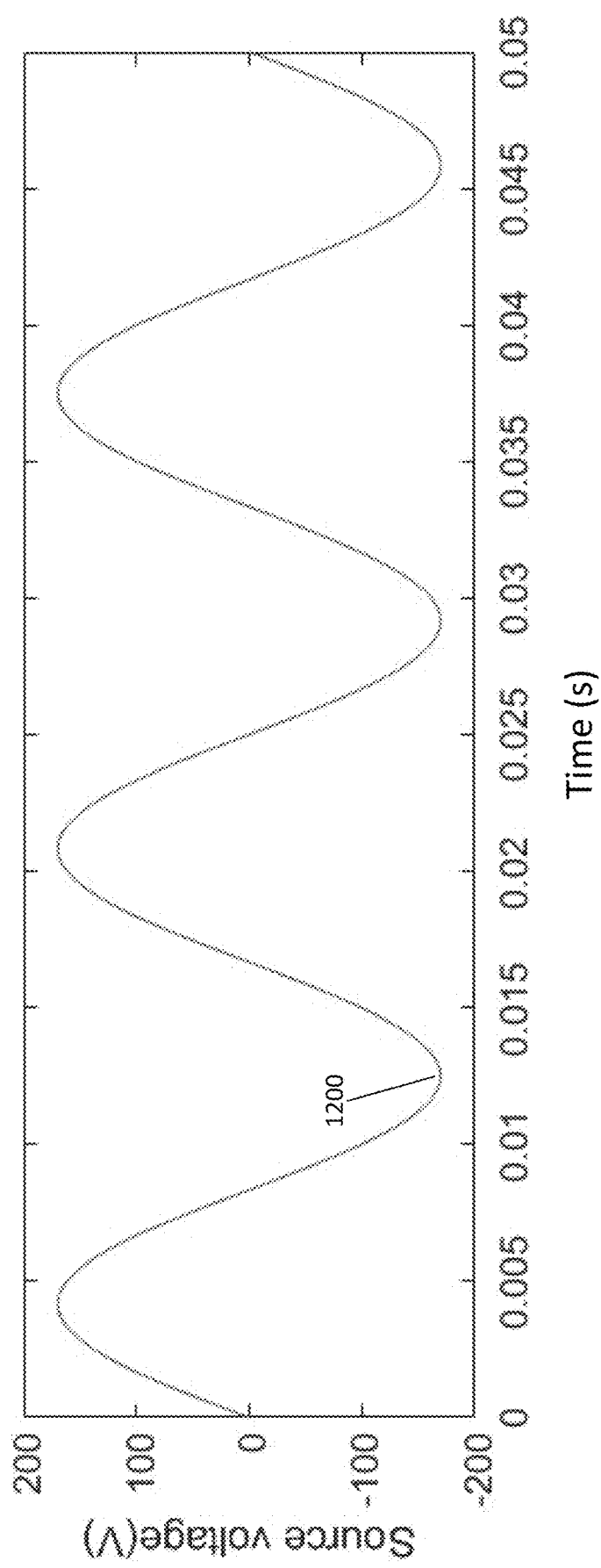
FIG. 12 shows a simulated source voltage provided to the AC-AC buck converter of FIG. 11 in accordance with an illustrative embodiment.
Figure 13:
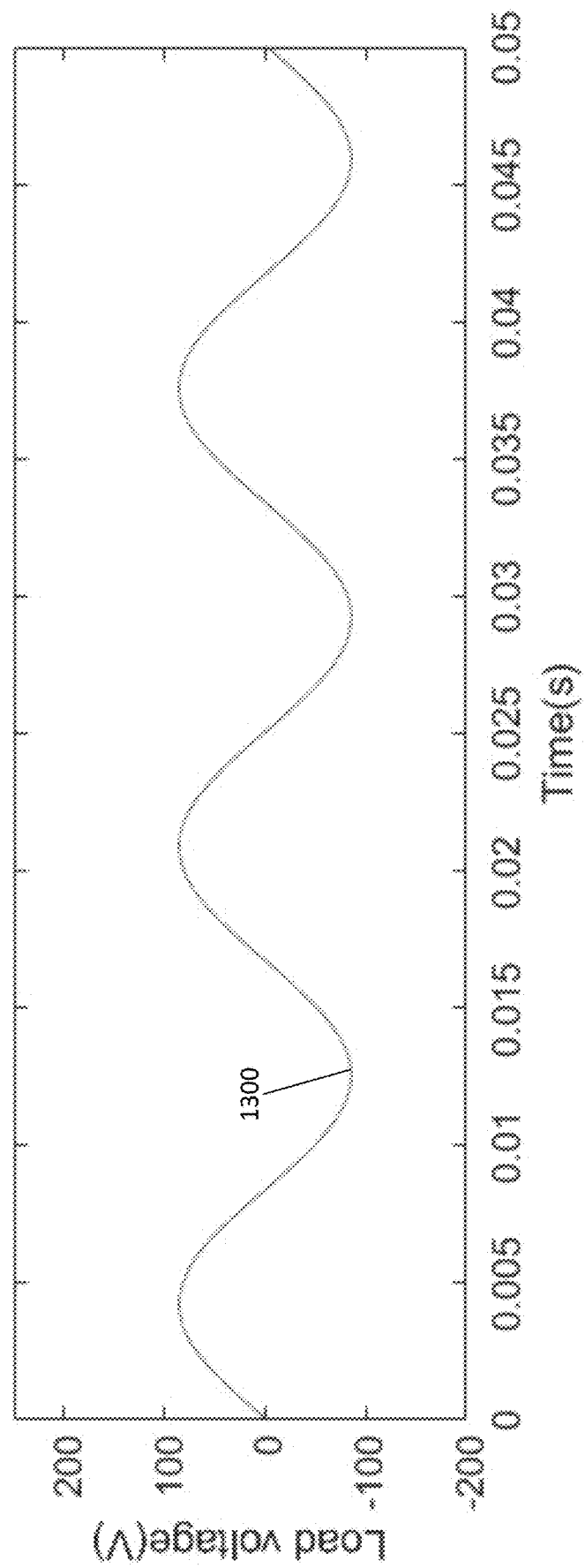
FIG. 13 shows a simulated load voltage generated from the AC-AC buck converter of FIG. 11 in accordance with an illustrative embodiment.

Referring to FIG. 12, a simulated source voltage 1200 provided to the AC-AC buck converter 1100 is shown in accordance with an illustrative embodiment. Referring to FIG. 13, a simulated load voltage 1300 generated from the AC-AC buck converter 1100 is shown in accordance with an illustrative embodiment. First semiconductor switch 100a and second semiconductor switch 100b are used as complimentary switches. A PWM output is interfaced to AC electrical load 402 through an L-C filter defined by inductor 1102 and second capacitor 1104 with an inductance value L of inductor 1102 and a second capacitance value $C_2$ of second capacitor 1104 chosen to provide a selected ripple reduction. First semiconductor switch 100a and second semiconductor switch 100b were operated to step down a voltage of AC electrical source 400, as shown in FIG. 12, by 50% to AC electrical load 402 as shown in FIG. 13. A similar approach can be used to implement any AC power converter including a boost converter, a buck-boost converter, a matrix converter, etc. though one or more semiconductor switches may be arranged in various manners and possibly with other circuit elements depending on a type of converter and/or other circuit elements with which the one or more semiconductor switches are integrated. A design of the L-C filter is similar to that corresponding to DC to DC converters and may be governed primarily by the switching frequency to select the inductance value L of inductor 1102 and the second capacitance value $C_2$ of second capacitor 1104.

Figure 14:
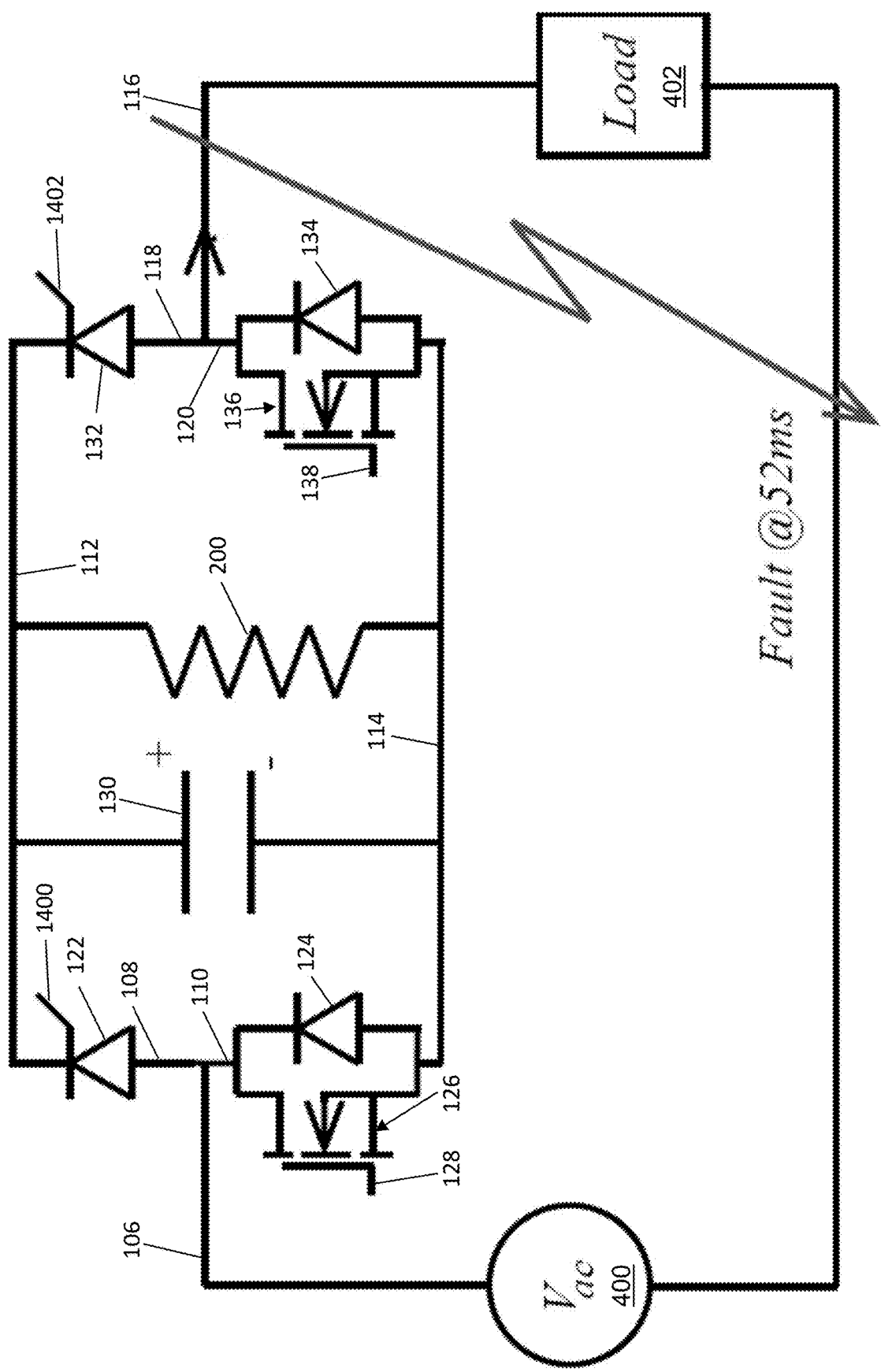
FIG. 14 is a circuit diagram of a first semiconductor switch of FIG. 1 connected to form an AC circuit breaker in accordance with an illustrative embodiment.

Referring to FIG. 14, a circuit diagram of semiconductor switch 100 connected to form an AC circuit breaker is shown in accordance with an illustrative embodiment. In the illustrative embodiment, semiconductor switch 100 configured to operate as an AC circuit breaker may include first diode 122 implemented as a thyristor or a silicone-controlled resistor (SCR) with a first control gate 1400, and second diode 132 implemented as a thyristor or an SCR with a second control gate 1402. Under normal on-conditions, first diode 122, second diode 132, first transistor 126, and second transistor 136 are switched to an on-state by controller 1702 using first control gate 1400 of first diode 122, second control gate 1402 of second diode 132, second terminal 128 of first transistor 126, and fifth terminal 138 of second transistor 136, respectively.

When an over-current, short circuit or any undesirable condition is detected, first diode 122, second diode 132, first transistor 126, and second transistor 136 are switched to an off-state by controller 1702 using first control gate 1400 of first diode 122, second control gate 1402 of second diode 132, second terminal 128 of first transistor 126, and fifth terminal 138 of second transistor 136, respectively. At the instant of turn-off, the current through one of first transistor 126 or second transistor 136 is immediately transferred to one of first diode 122 or of second diode 132, respectively, depending on a polarity of the current. The current flows through capacitor 130 charging it further until the current reaches zero at which point first diode 122 or second diode 132 stop conducting, and the AC circuit breaker is in its off-state. The current through first diode 122 or second diode 132 is extinguished by a net voltage across capacitor 130 and the source voltage appearing across the total of fault and source impedances. The capacitance value C of capacitor 130 may be chosen to absorb a certain design value of interruption current for a half cycle of the AC waveform of AC electrical source 400 with an acceptable additional voltage and also to have enough charge stored to extinguish the fault current.

Figure 15:
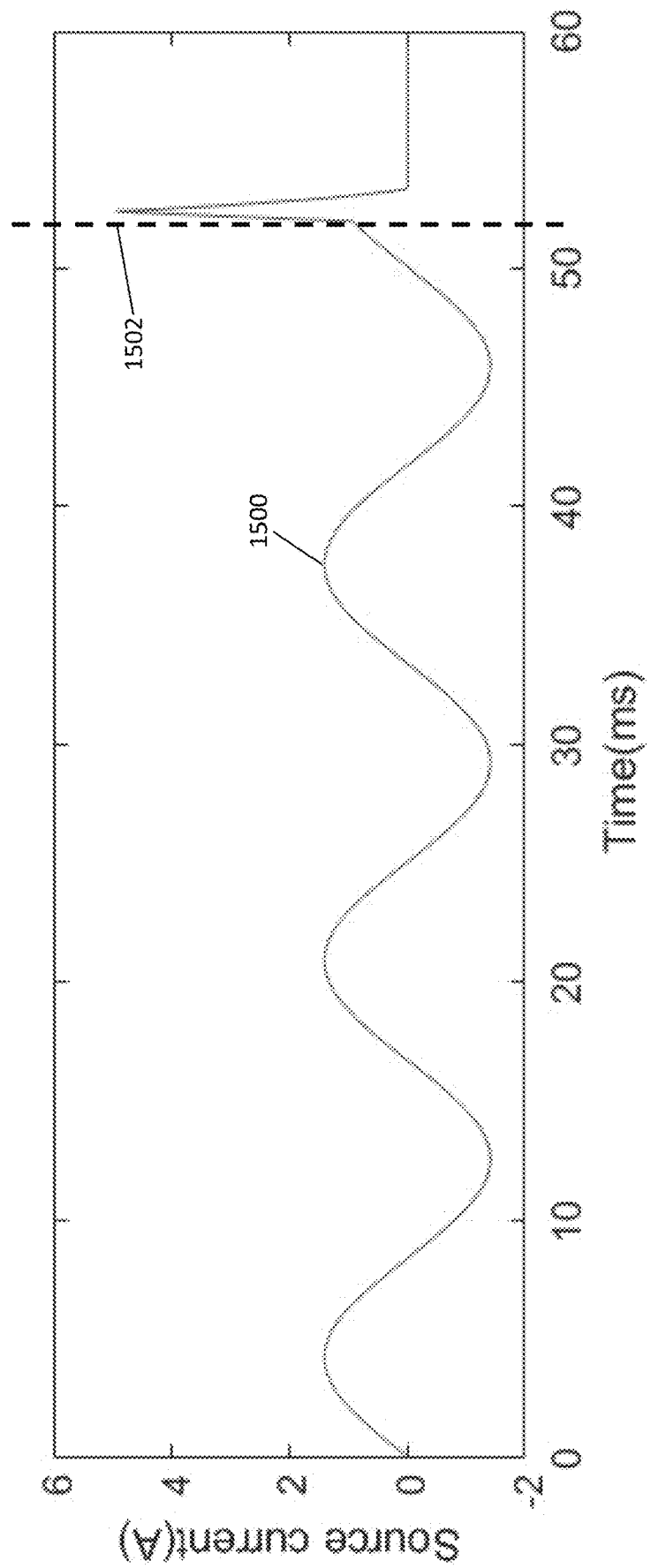
FIG. 15 shows a simulated source current provided to the AC circuit breaker of FIG. 14 in accordance with an illustrative embodiment.
Figure 16:
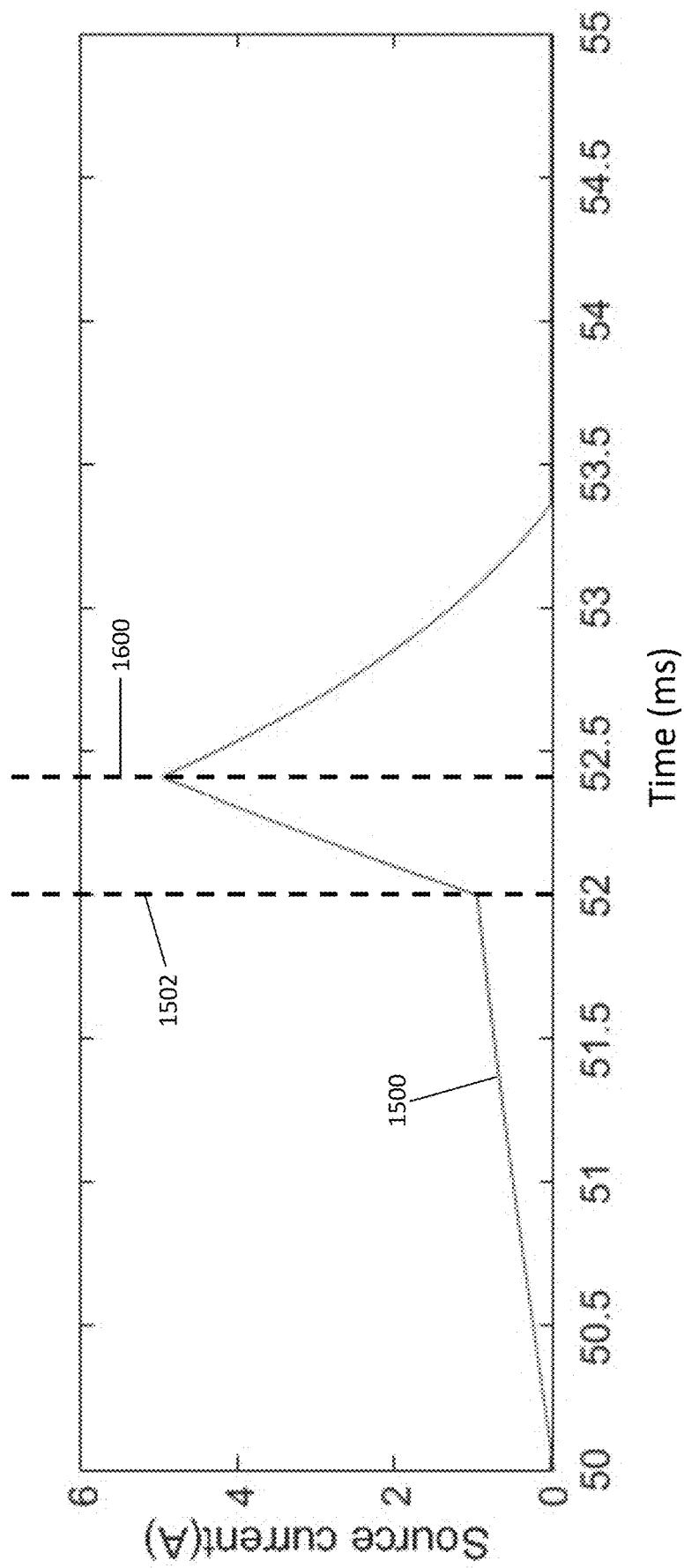
FIG. 16 shows the simulated source current provided to the AC circuit breaker of FIG. 14 zoomed to a time period when a fault condition occurs in accordance with an illustrative embodiment.

Referring to FIG. 15, a simulated source current 1500 provided to the AC circuit breaker of FIG. 14 is shown in accordance with an illustrative embodiment. Referring to 16, the simulated source current provided to the AC circuit breaker of FIG. 14 zoomed to a time period when a fault condition 1502 occurs is shown in accordance with an illustrative embodiment. Fault condition 1502 occurred at 52 milliseconds. A breaker trip 1600 occurred at approximately 52.4 milliseconds.

Figure 17:
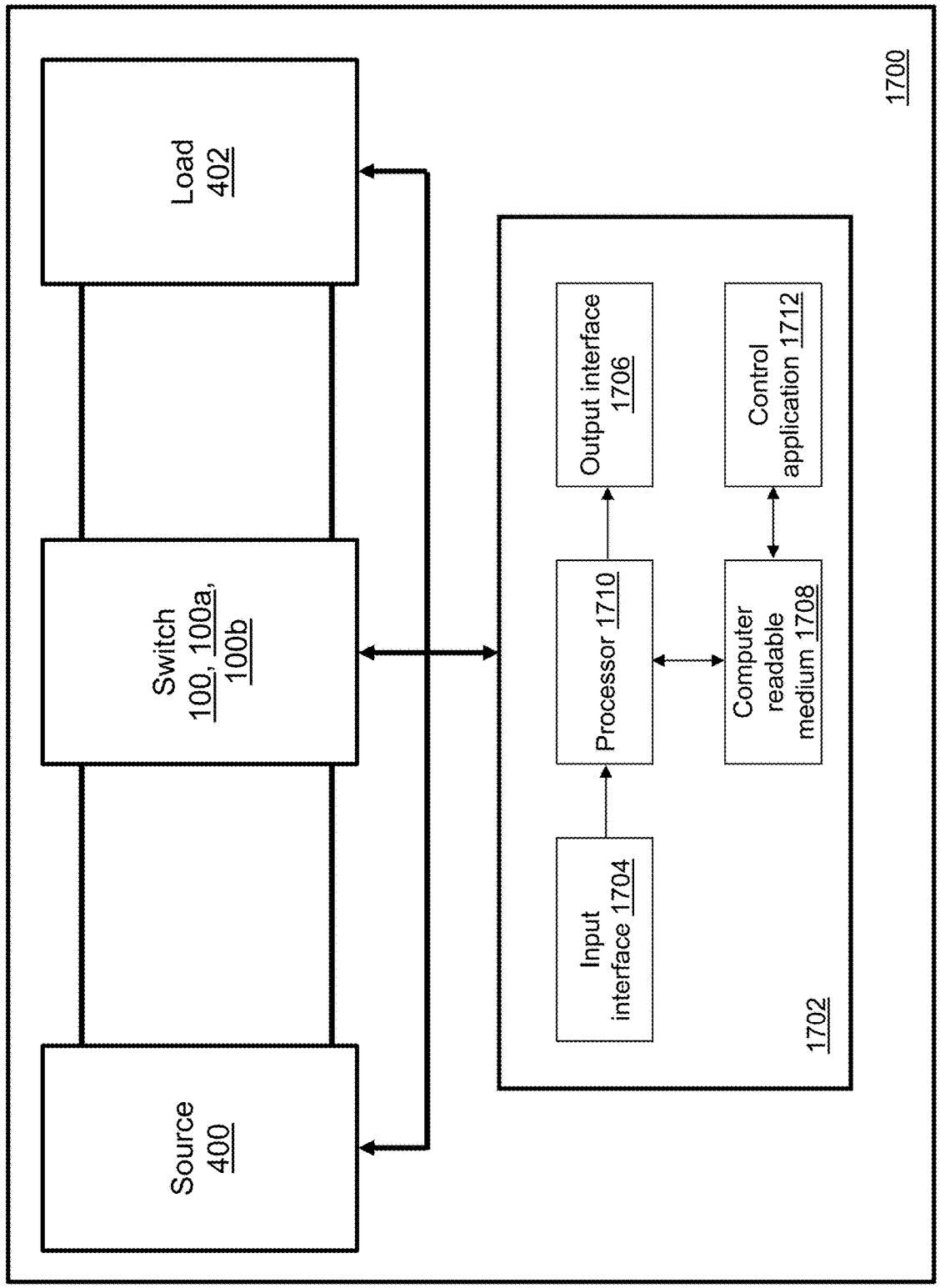
FIG. 17 is a block diagram of a power conversion system in accordance with an illustrative embodiment.

Referring to FIG. 17, a power conversion system 1700 is shown in accordance with an illustrative embodiment. Power conversion system 1700 may include controller 1702, AC electrical source 400, AC electrical load 402, and one or more of semiconductor switch 100, first semiconductor switch 100a, second semiconductor switch 100b, etc. arranged in various configurations, for example, as discussed above. Controller 1702 may be electrically connected to AC electrical source 400 and to AC electrical load 402 to receive voltage, current, and/or power values used to define the parameters that control the energy transfer between AC electrical source 400 and AC electrical load 402 through semiconductor switch 100, first semiconductor switch 100a, second semiconductor switch 100b, etc. Semiconductor switch 100, first semiconductor switch 100a, second semiconductor switch 100b, etc. are also connected to controller 1702 that controls transmission of the on-state switching signal or the off-state switching signal to second terminal 128 of first transistor and to fifth terminal 138 of second transistor 138. The voltage, current, and/or power values may be received for each switching frequency interval, also referred to herein as a switching period, or may be received less frequently or more frequently depending on the dynamic needs of power conversion system 1700. Controller 1702 may dynamically control semiconductor switch 100, first semiconductor switch 100a, second semiconductor switch 100b, etc. to act as a 4-quadrant switch in an AC circuit breaker, in a power sharing converter, in a PWM resistive chopper, in a PWM AC buck converter, etc. to control the supply of current between AC electrical source 400 and AC electrical load 402 through command signals input to semiconductor switch 100, first semiconductor switch 100a, second semiconductor switch 100b, etc.

Controller 1702 may include an input interface 1704, an output interface 1706, a computer-readable medium 1708, a processor 1710, and a control application 1712. Fewer, different, and additional components may be incorporated into controller 1702. For example, controller 1702 may include a communication interface (not shown). The communication interface provides an interface for receiving and transmitting data between devices using various protocols, transmission technologies, and media as understood by those skilled in the art. The communication interface may support communication using various transmission media that may be wired and/or wireless.

Input interface 1704 provides an interface for receiving information from a user or from other devices for entry into controller 1702 as understood by those skilled in the art. Input interface 1704 may interface with various input technologies including, but not limited to, a keyboard, a mouse, a display, a track ball, a keypad, one or more buttons, etc. to allow the user to enter information into controller 1702 or to make selections in a user interface displayed on the display. The same interface may support both input interface 1704 and output interface 1706. Controller 1702 may have one or more input interfaces that use the same or a different input interface technology. Additional inputs through input interface 1704 may include the voltage, current, and/or power values received from AC electrical source 400 and/or AC electrical load 402.

Output interface 1706 provides an interface for outputting information for review by a user of controller 1702 and for input to another device. For example, output interface 1706 may interface with various output technologies including, but not limited to, the display and a printer, etc. Controller 1702 may have one or more output interfaces that use the same or a different interface technology. Additional outputs through output interface 1706 from controller 1702 may be the command signals to semiconductor switch 100, first semiconductor switch 100a, second semiconductor switch 100b, etc.

Computer-readable medium 1708 is an electronic holding place or storage for information so the information can be accessed by processor 1710 as understood by those skilled in the art. Computer-readable medium 1708 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Controller 1702 may have one or more computer-readable media that use the same or a different memory media technology. For example, computer-readable medium 1708 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Controller 1702 also may have one or more drives that support the loading of a memory media such as a CD, DVD, an external hard drive, etc. One or more external hard drives further may be connected to controller 1702 using the communication interface.

Processor 1710 executes instructions as understood by those skilled in the art. The instructions may be carried out by a special purpose computer, logic circuits, or hardware circuits. Processor 1710 may be implemented in hardware and/or firmware. Processor 1710 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 1710 operably couples with input interface 1704, with output interface 1706, and with computer-readable medium 1708 to receive, to send, and to process information. Processor 1710 may retrieve a set of instructions from a permanent memory device and copy the instructions in an executable form to a temporary memory device that is generally some form of RAM. Controller 1702 may include a plurality of processors that use the same or a different processing technology.

Control application 1712 performs operations associated with implementing some or all of the control of semiconductor switch 100, first semiconductor switch 100a, second semiconductor switch 100b, etc. to act as a 4-quadrant switch in an AC circuit breaker, in a power sharing converter, in a PWM resistive chopper, in a PWM AC converter, etc. The operations may be implemented using hardware, firmware, software, or any combination of these methods. Referring to the example embodiment of FIG. 1, control application 1712 is implemented in software (comprised of computer-readable and/or computer-executable instructions) stored in computer-readable medium 1708 and accessible by processor 1710 for execution of the instructions that embody the operations of control application 1712. Control application 1712 may be written using one or more programming languages, assembly languages, scripting languages, etc.

As used in this disclosure, the term "connect" indicates an electrical connection whether by wire or by air or some other medium that conducts an electrical signal. The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A semiconductor switch comprising:
   a first diode including a first anode and a first cathode;
   a second diode including a second anode and a second cathode;
   a third diode including a third anode and a third cathode;
   a fourth diode including a fourth anode and a fourth cathode;
   a first transistor including a first terminal, a second terminal, and a third terminal;

a second transistor including a fourth terminal, a fifth terminal, and a sixth terminal; and a capacitor including a seventh terminal and an eighth terminal, wherein the third anode of the third diode is connected to the third terminal of the first transistor and the third cathode of the third diode is connected to the first terminal of the first transistor and to the first anode of the first diode, wherein the fourth anode of the fourth diode is connected to the third terminal of the second transistor and the fourth cathode of the fourth diode is connected to the first terminal of the second transistor and to the second anode of the second diode, wherein the first cathode of the first diode is connected to the second cathode of the second diode and to the seventh terminal of the capacitor, wherein the third anode of the third diode is connected to the fourth anode of the fourth diode and to the eighth terminal of the capacitor opposite the seventh terminal of the capacitor.

2. The semiconductor switch of claim 1, wherein the first diode further includes a first control terminal and the second diode further includes a second control terminal, wherein the first control terminal and the second control terminal are configured to control a state of the first diode and the second diode, respectively.

3. The semiconductor switch of claim 1, wherein the first transistor is a first metal oxide semiconductor field effect transistor (MOSFET) and the second transistor is a second MOSFET.

4. The semiconductor switch of claim 3, wherein the first MOSFET and the second MOSFET are n-channel type MOSFETs.

5. The semiconductor switch of claim 4, wherein the first MOSFET and the second MOSFET are enhancement mode type MOSFETs.

6. The semiconductor switch of claim 1, wherein a source line is connected between the first anode of the first diode, the third cathode of the third diode, and the first terminal of the first transistor, and a load line is connected between the second anode of the second diode, the fourth cathode of the fourth diode, and the first terminal of the second transistor.

7. The semiconductor switch of claim 1, wherein the first diode has a same current rating as the second diode.

8. The semiconductor switch of claim 7, wherein the third diode has a same current rating as the fourth diode.

9. The semiconductor switch of claim 8, wherein the current rating of the first diode is less than the current rating of the third diode.

10. The semiconductor switch of claim 1, wherein the first transistor is configured to conduct a current from the first terminal to the third terminal when an on-state signal is sent to the second terminal.

11. A power conversion system comprising:
a semiconductor switch connected between an alternating current (AC) electrical source and an AC electrical load circuit, the semiconductor switch comprising
a first diode including a first anode and a first cathode;
a second diode including a second anode and a second cathode;
a third diode including a third anode and a third cathode;
a fourth diode including a fourth anode and a fourth cathode;
a first transistor including a first terminal, a second terminal, and a third terminal;

a second transistor including a fourth terminal, a fifth terminal, and a sixth terminal; and a capacitor including a seventh terminal and an eighth terminal, wherein the third anode of the third diode is connected to the third terminal of the first transistor and the third cathode of the third diode is connected to the first terminal of the first transistor and to the first anode of the first diode, wherein the fourth anode of the fourth diode is connected to the third terminal of the second transistor and the fourth cathode of the fourth diode is connected to the first terminal of the second transistor and to the second anode of the second diode, wherein the first cathode of the first diode is connected to the second cathode of the second diode and to the seventh terminal of the capacitor, wherein the third anode of the third diode is connected to the fourth anode of the fourth diode and to the eighth terminal of the capacitor opposite the seventh terminal of the capacitor.

12. The power conversion system of claim 11, wherein a plurality of semiconductor switches are connected in series between the AC electrical source and the AC electrical load circuit, wherein the semiconductor switch is one of the plurality of semiconductor switches.

13. The power conversion system of claim 11, further comprising:
a second semiconductor switch connected between a second AC electrical source and the AC electrical load circuit, the second semiconductor switch comprising
a fifth diode including a fifth anode and a fifth cathode;
a sixth diode including a sixth anode and a sixth cathode;
a seventh diode including a seventh anode and a seventh cathode;
an eighth diode including an eighth anode and an eighth cathode;
a third transistor including a ninth terminal, a tenth terminal, and an eleventh terminal;
a fourth transistor including a twelfth terminal, a thirteenth terminal, and a fourteenth terminal; and
a second capacitor including a fifteenth terminal and a sixteenth terminal,
wherein the seventh anode of the seventh diode is connected to the eleventh terminal of the third transistor and the seventh cathode of the seventh diode is connected to the ninth terminal of the third transistor and to the fifth anode of the fifth diode,
wherein the eighth anode of the eighth diode is connected to the fourteenth terminal of the fourth transistor and the eighth cathode of the eighth diode is connected to the twelfth terminal of the fourth transistor and to the sixth anode of the sixth diode,
wherein the fifth cathode of the fifth diode is connected to the sixth cathode of the sixth diode and to the fifteenth terminal of the second capacitor,
wherein the seventh anode of the seventh diode is connected to the eighth anode of the eighth diode and to the sixteenth terminal of the second capacitor opposite the fifteenth terminal of the second capacitor.

14. The power conversion system of claim 13, further comprising a controller configured to send a signal to switch the second terminal of the first transistor to an on-state when the fifth terminal of the second transistor is in an off-state.

15. The power conversion system of claim 14, wherein the controller is further configured to send a second signal to switch the fifth terminal of the second transistor to an on-state when the second terminal of the first transistor is in an off-state.

16. The power conversion system of claim 11, further comprising:
an inductor including a ninth terminal and a tenth terminal;
a second capacitor including an eleventh terminal and a twelfth terminal; and
a second semiconductor switch connected between the second AC electrical source and the ninth terminal of the inductor, the second semiconductor switch comprising
a fifth diode including a fifth anode and a fifth cathode;
a sixth diode including a sixth anode and a sixth cathode;
a seventh diode including a seventh anode and a seventh cathode;
an eighth diode including an eighth anode and an eighth cathode;
a third transistor including a thirteenth terminal, a fourteenth terminal, and a fifteenth terminal;
a fourth transistor including a sixteenth terminal, a seventeenth terminal, and an eighteenth terminal; and
a third capacitor including a nineteenth terminal and a twentieth terminal,
wherein the seventh anode of the seventh diode is connected to the fifteenth terminal of the third transistor and the seventh cathode of the seventh diode is connected to the thirteenth terminal of the third transistor and to the fifth anode of the fifth diode,
wherein the eighth anode of the eighth diode is connected to the eighteenth terminal of the fourth transistor and the eighth cathode of the eighth diode is connected to the sixteenth terminal of the fourth transistor and to the sixth anode of the sixth diode,
wherein the fifth cathode of the fifth diode is connected to the sixth cathode of the sixth diode and to the nineteenth terminal of the third capacitor,
wherein the seventh anode of the seventh diode is connected to the eighth anode of the eighth diode and to the twentieth terminal of the third capacitor opposite the nineteenth terminal of the third capacitor,
wherein a source connector of the semiconductor switch is connected to a load connector of the second semiconductor switch and to the ninth terminal of the inductor,
wherein the second capacitor is connected in parallel with the AC electrical load circuit and the eleventh terminal of the capacitor is connected to the tenth terminal of the inductor opposite the ninth terminal of the inductor,
wherein a source connector of the second semiconductor switch is connected to the AC electrical source,
wherein a load connector of the semiconductor switch is connected to the twelfth terminal of the second capacitor opposite the eleventh terminal of the second capacitor.

17. The power conversion system of claim 11, further comprising a controller configured to send a signal to switch the second terminal of the first transistor and the fifth terminal of the second transistor to an on-state simultaneously.

18. The power conversion system of claim 17, wherein the controller is further configured to send a second signal to switch the second terminal of the first transistor and the fifth terminal of the second transistor to an off-state simultaneously.

19. The power conversion system of claim 11, wherein the first diode further includes a first control terminal and the second diode further includes a second control terminal, wherein the first control terminal and the second control terminal are configured to control a state of the first diode and the second diode, respectively.

20. The power conversion system of claim 19, further comprising a controller configured to send a signal to switch the first control terminal of the first diode and the second control terminal of the second diode to an off-state simultaneously.

* * * * *